(12) United States Patent
Higashiyama et al.

(10) Patent No.: US 11,428,931 B2
(45) Date of Patent: Aug. 30, 2022

(54) DISPLAY DEVICE, DISPLAY CONTROL METHOD, AND STORAGE MEDIUM

(71) Applicant: HONDA MOTOR CO., LTD., Tokyo (JP)

(72) Inventors: Masafumi Higashiyama, Wako (JP); Takuya Kimura, Wako (JP); Shinji Kawakami, Wako (JP); Tatsuya Iwasa, Wako (JP); Yuji Kawashima, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 528 days.

(21) Appl. No.: 16/576,879

(22) Filed: Sep. 20, 2019

(65) Prior Publication Data
US 2020/0103649 A1  Apr. 2, 2020

(30) Foreign Application Priority Data

Sep. 27, 2018  (JP) .............................. JP2018-181658

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 27/18* (2013.01); *G03B 21/2066* (2013.01); *G02B 2027/014* (2013.01)

(58) Field of Classification Search
CPC ................ G02B 27/0101; G02B 27/18; G02B 2027/014; B60K 35/00; B60K 2370/1529;
(Continued)

(56) References Cited

U.S. PATENT DOCUMENTS 10,139,238 B2 * 11/2018 Widmer ................. G01C 21/36
2009/0135092 A1 * 5/2009 Uematsu ............ G02B 27/0101
345/7
(Continued)

FOREIGN PATENT DOCUMENTS

JP  2007-230491  9/2007
JP  2015-134521  7/2015
(Continued)

OTHER PUBLICATIONS

Japanese Office Action for Japanese Patent Application No. 2018-181658 dated Mar. 17, 2020.
(Continued)

*Primary Examiner* — Ibrahim A Khan
(74) *Attorney, Agent, or Firm* — Amin, Turocy & Watson, LLP

(57) ABSTRACT

A display device includes: a light projection device configured to project light including an image; an optical mechanism provided on a path of the light and configured to be capable of adjusting a distance from a predetermined position to a position at which the light is formed as a virtual image; and a control device configured to control the light projection device. The control device corrects a position of an image formed based on an external environment of a vehicle when a distance between a gazing point of an occupant of the vehicle and a vanishing point of a travel lane of the vehicle is less than a predetermined distance, and suppresses the correction of the position of the image when the distance between the gazing point and the vanishing point is equal to or greater than the predetermined distance.

8 Claims, 10 Drawing Sheets

(51) Int. Cl.
*G03B 21/20* (2006.01)
*G02B 27/18* (2006.01)

(58) Field of Classification Search
CPC ... G03B 21/2066; G03B 21/142; G03B 21/28
See application file for complete search history.

(56) References Cited

U.S. PATENT DOCUMENTS

| | | | | |
|---|---|---|---|---|
| 2011/0112756 | A1* | 5/2011 | Winkler | G01C 21/3647 |
| | | | | 701/533 |
| 2012/0268262 | A1* | 10/2012 | Popovic | G02B 27/01 |
| | | | | 340/438 |
| 2012/0307059 | A1* | 12/2012 | Yamakage | G08G 1/166 |
| | | | | 348/148 |
| 2012/0327188 | A1* | 12/2012 | Takemura | G06V 20/588 |
| | | | | 348/148 |
| 2013/0141580 | A1* | 6/2013 | Stein | H04N 7/18 |
| | | | | 348/148 |
| 2015/0204687 | A1* | 7/2015 | Yoon | G06T 19/006 |
| | | | | 701/436 |
| 2015/0352954 | A1 | 12/2015 | Cho et al. | |
| 2018/0031849 | A1* | 2/2018 | Omanovic | B60K 35/00 |
| 2018/0218713 | A1* | 8/2018 | Kusanagi | G02B 27/0101 |
| 2018/0365859 | A1* | 12/2018 | Oba | G06T 7/85 |
| 2019/0042860 | A1* | 2/2019 | Lee | G06V 10/25 |
| 2019/0236386 | A1* | 8/2019 | Yu | B60W 30/09 |
| 2019/0333481 | A1* | 10/2019 | Hato | B60K 35/00 |

FOREIGN PATENT DOCUMENTS

| | | |
|---|---|---|
| JP | 2016-074410 | 5/2016 |
| JP | 2017-087826 | 5/2017 |
| JP | 2017-091115 | 5/2017 |
| JP | 2017-094882 | 6/2017 |
| JP | 2017-149335 | 8/2017 |
| JP | 2018-072686 | 5/2018 |
| JP | 2018-140714 | 9/2018 |
| JP | 2018-151903 | 9/2018 |

OTHER PUBLICATIONS

Japanese Notice of Allowance for Japanese Patent Application No. 2020-128570 dated Aug. 3, 2021.
Japanese Notice of Allowance for Japanese Patent Application No. 2018-181658 dated Jun. 30, 2020.

* cited by examiner

DISPLAY DEVICE, DISPLAY CONTROL METHOD, AND STORAGE MEDIUM

CROSS-REFERENCE TO RELATED APPLICATION

Priority is claimed on Japanese Patent Application No. 2018-181658, filed Sep. 27, 2018, the content of which is incorporated herein by reference.

BACKGROUND

Field of the Invention

The present invention relates to a display device, a display control method, and a storage medium.

Description of Related Art

In the related art, head-up display devices (referred to as HUD device) displaying images related to information for drivers on front windshields are known (for example, see Japanese Unexamined Patent Application, First Publication No. 2017-91115). When various marks representing obstacles, alerts, and travel directions are displayed using a HUD device at a predetermined position of a front windshield to overlap with scenery in front of a vehicle, a driver can comprehend the various kinds of displayed information while maintaining the directions of his or her line of sight forward at the time of driving.

SUMMARY

In a HUD device of the related art, however, a display position of an image is corrected based on an external environment of a vehicle, but visibility of the image deteriorates due to correction of the position depending on a travel situation in some cases.

The present invention is devised in view of such circumstances and an object of the present invention is to provide a display device, a display control method, and a storage medium capable of improving visibility.

A display device, a display method, a display control method, and a storage medium according to the present invention adopt the following configurations.

(1) A display device according to an aspect of the present invention is a display device including: a light projection device configured to project light including an image; an optical mechanism provided on a path of the light and configured to be capable of adjusting a distance from a predetermined position to a position at which the light is formed as a virtual image; and a control device configured to control the light projection device. The control device corrects a position of an image formed based on an external environment of a vehicle when a distance between a gazing point of an occupant of the vehicle and a vanishing point of a travel lane of the vehicle is less than a predetermined distance, and suppresses the correction of the position of the image when the distance between the gazing point and the vanishing point is equal to or greater than the predetermined distance.

(2) In the control device according to the aspect (1), the control device may suppress the correction of the position of the image when the vehicle is in a turning state.

(3) In the control device according to the aspect (1), the control device may suppress the correction of the position of the image when a speed of the vehicle is equal to or less than a predetermined speed.

(4) In the control device according to the aspect (1), the control device may suppress the correction of the position of the image when a road on which the vehicle is traveling is congested.

(5) In the control device according to the aspect (1), the control device may change a degree of the correction of the position of the image based on an external environment of the vehicle.

(6) In the control device according to the aspect (1), the control device may suppress the correction of the position of the image when an end of the image comes into contact with an upper end or a lower end of a displayable region of the image.

(7) A display control method according to another aspect of the present invention is a display control method in a display device that includes a light projection device projecting light including an image, an optical mechanism provided on a path of the light and capable of adjusting a distance from a predetermined position to a position at which the light is formed as a virtual image, and a control device controlling the light projection device. The method includes: correcting a position of an image formed based on an external environment of a vehicle when a distance between a gazing point of an occupant of the vehicle and a vanishing point of a travel lane of the vehicle is less than a predetermined distance; and suppressing the correction of the position of the image when the distance between the gazing point and the vanishing point is equal to or greater than the predetermined distance.

(8) A storage medium according to still another aspect of the present invention is a computer-readable non-transitory storage medium that stores a program causing a display device that includes a light projection device projecting light including an image, an optical mechanism provided on a path of the light and capable of adjusting a distance from a predetermined position to a position at which the light is formed as a virtual image, and a control device controlling the light projection device to perform: correcting a position of an image formed based on an external environment of a vehicle when a distance between a gazing point of an occupant of the vehicle and a vanishing point of a travel lane of the vehicle is less than a predetermined distance; and suppressing the correction of the position of the image when the distance between the gazing point and the vanishing point is equal to or greater than the predetermined distance.

According to the aspects (1) to (8), it is possible to improve visibility.

DESCRIPTION OF EMBODIMENTS

Hereinafter, embodiments of a display device, a display control method, and a storage medium according to the present invention will be described with reference to the drawings. The display device according to an embodiment is, for example, a device that is mounted in a vehicle (hereinafter referred to as a vehicle M) and enables an image to be viewed by overlapping the image on scenery. The display device can be referred to as an HUD device. For example, the display device is a device that enables a viewer to see a virtual image by projecting light including an image to a front windshield of the vehicle M. The viewer is, for example, a driver, but may be an occupant other than the driver. A display device that has a light transmission property or projects light to a transparent member (lenses of glasses, a visor, or the like) of a device worn on the body of a person may be mounted. In the following description, the display device is assumed to be a device that is mounted in the vehicle M and projects light including an image to a front windshield.

In the following description, a positional relation or the like will be described appropriately using the XYZ coordinate system.

In the following description, a "virtual image" is referred to as an "image" in some cases.

[Overall Configuration]

Figure 1:
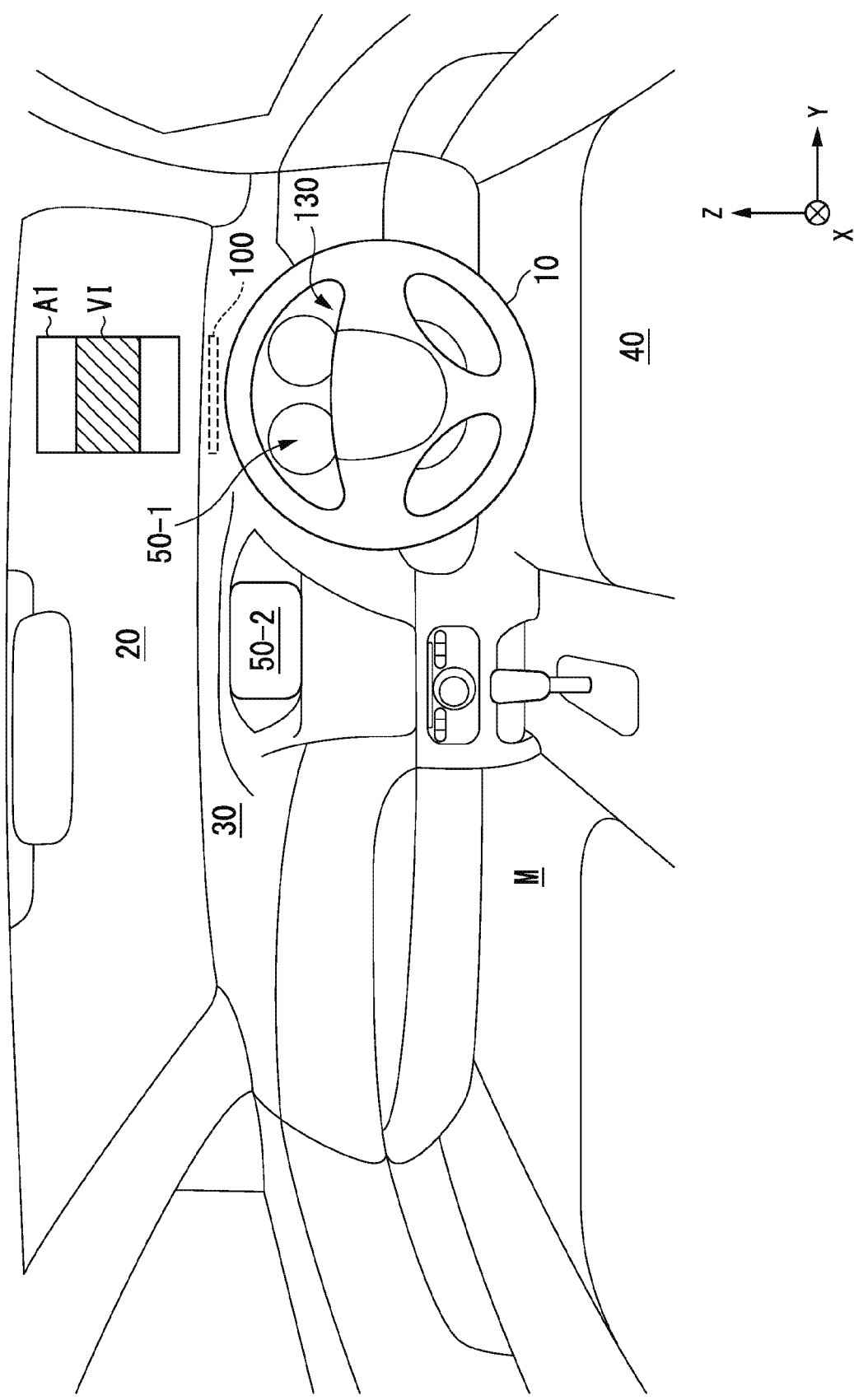
FIG. 1 is a diagram illustrating an exemplary configuration of a vehicle interior of a vehicle in which a display device is mounted according to an embodiment.

FIG. 1 is a diagram illustrating an exemplary configuration of a vehicle interior of the vehicle M in which a display device 100 is mounted according to an embodiment. The vehicle M includes, for example, a steering wheel 10 that controls steering of the vehicle M, a front windshield (an example of a reflector) 20 that demarcates the vehicle exterior and the vehicle interior, and an instrument panel 30. The front windshield 20 is a member that has a light transmission property. The display device 100 enables a driver sitting on a driving seat 40 to see a virtual image VI by projecting light including an image to a displayable region A1 provided in a part of the front windshield 20 in front of the driving seat 40.

For example, the display device 100 enables the driver to see an image formed by imaging information for supporting driving of the driver as the virtual image VI. The information for supporting driving of the driver includes, for example, information such as a speed of the vehicle M, a driving force allocation ratio, the number of engine rotations, a driving state of a driving support function, a shift position, a sign recognition result, and an intersection position. The driving support function includes, for example, a direction instruction function for guiding the vehicle M up to a preset destination, adaptive cruise control (ACC), a lane keep assist system (LKAS), a collision mitigation brake system (CMBS), and a traffic jam assist function. The driving support function may also include, for example, a telephone function of controlling receiving and sending a call and making a call of a telephone mounted in the vehicle M.

In addition to the display device 100, a first display 50-1 or a second display 50-2 may be provided in the vehicle M. The first display 50-1 is, for example, a display device that is provided near the front of the driving seat 40 in the instrument panel 30 and enables the driver to see from a gap of the steering wheel 10 or beyond the steering wheel 10. The first display 50-1 displays, for example, information for supporting driving of the driver, or the like. The second display 50-2 is mounted in, for example, the middle of the instrument panel 30. The second display 50-2 displays, for example, an image corresponding to a navigation process performed by a navigation device (not illustrated) mounted in the vehicle M, a video of a partner in a videophone, and the like. The second display 50-2 displays a television program, reproduces DVD, or displays content of a downloaded video or the like. The first display 50-1 and the second display 50-2 may functions as a touch panel device and receive an operation from an occupant. Content of a received operation is output to the display device 100 or another onboard device.

An operation switch (an example of an operation device) 130 that receives an instruction to switch ON/OFF of display by the display device 100 or an instruction to adjust the position of the virtual image VI is provided in the vehicle M. The operation switch 130 is mounted at, for example, a position at which the driver sitting on the driving seat 40 can perform an operation without considerably changing his or her posture. For example, the operation switch 130 may be provided in front of the first display 50-1, may be provided in a boss portion of the steering wheel 10, or may be provided in a spoke connecting the steering wheel 10 to the instrument panel 30.

Figure 2:
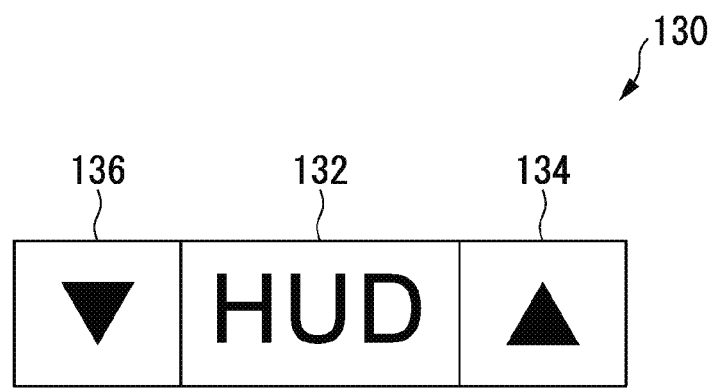
FIG. 2 is a diagram illustrating an operation switch according to the embodiment.

FIG. 2 is a diagram illustrating the operation switch 130 according to the embodiment. The operation switch 130 includes, for example, a main switch 132 and adjustment switches 134 and 136. The main switch 132 is a switch that switches between ON/OFF of the display device 100.

The adjustment switch 134 is, for example, a switch that receives an instruction (an adjustment operation) to move the position of the virtual image VI seen in a space transmitting the displayable range A1 from a visual line position P1 of the driver to the upper side (hereinafter referred to as an upper direction) in a vertical direction Z. The driver can continuously move a position at which the virtual image VI is seen in the upper direction within the displayable region A1 by continuously pressing the adjustment switch 134.

The adjustment switch 136 is a switch that receives an instruction (an adjustment operation) to move the position of the above-described virtual image VI to a lower side (hereinafter referred to as a lower direction) in the vertical direction Z. The driver can continuously move a position at which the virtual image VI is seen in the lower direction within the displayable region A1 by continuously pressing the adjustment switch 136.

The adjustment switch 134 may be a switch that increases luminance of the seen virtual image VI, instead of (or in addition to) the movement of the position of the virtual image VI in the upper direction. The adjustment switch 136 may be a switch that decreases luminance of the seen virtual image VI, instead of (or in addition to) the movement of the position of the virtual image VI in the lower direction. Content of instructions received by the adjustment switches 134 and 136 may be switched based on a certain operation.

The certain operation is, for example, a long pressing operation of the main switch 132. The operation switch 130 may include, for example, a switch for selecting display content or a switch for adjusting luminance of a simply displayed virtual image in addition to each switch illustrated in FIG. 2.

Figure 3:
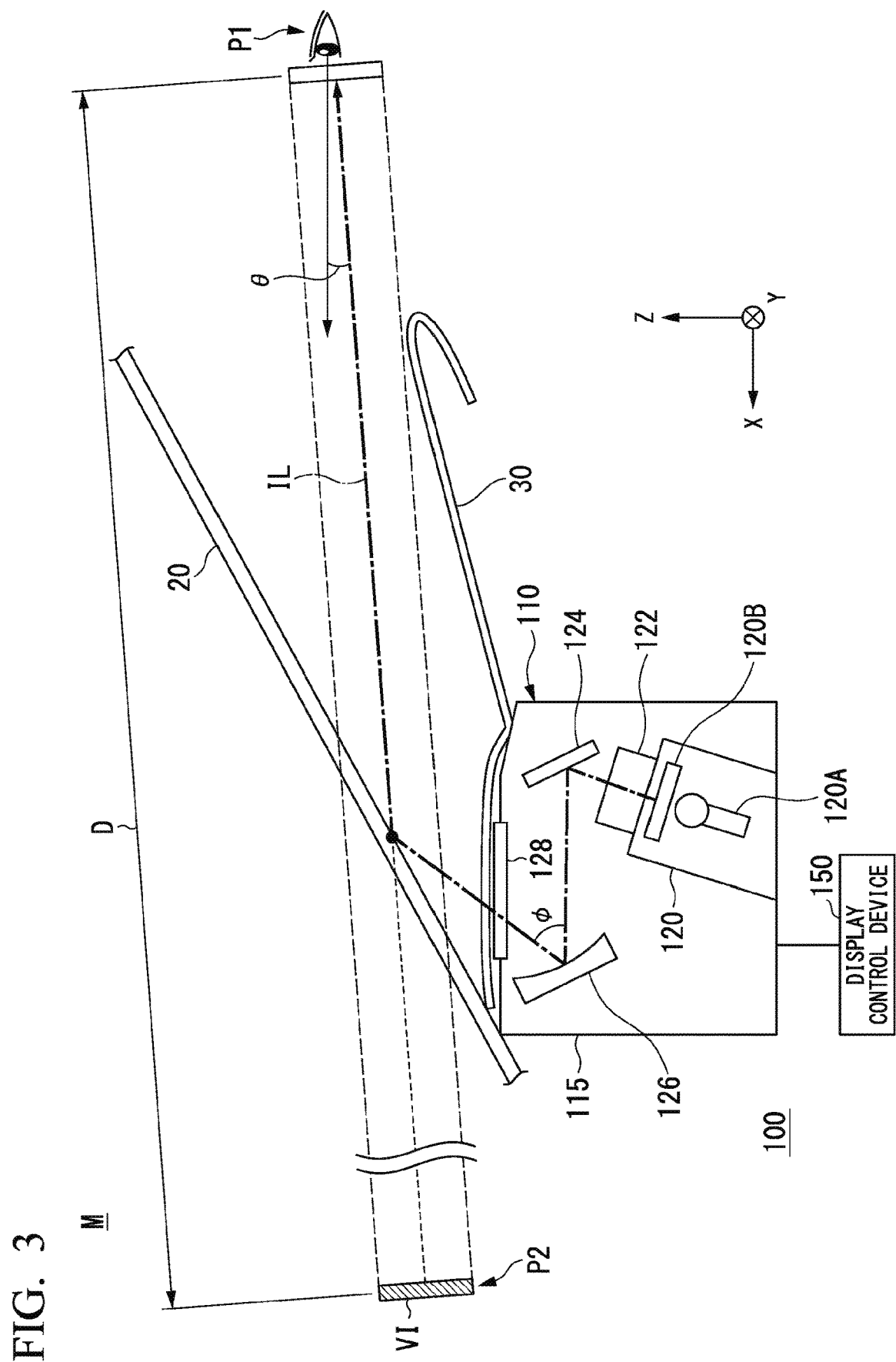
FIG. 3 is a diagram illustrating a partial configuration of the display device.

FIG. 3 is a diagram illustrating a partial configuration of the display device 100. The display device 100 includes, for example, a display 110 and a display control device 150. A combination of the display control device 150, an optical system controller 170 to be described below, and a display controller 172 to be described below is an example of a "control device." The display 110 accommodates, for example, a light projection device 120, an optical mechanism 122, a flat mirror 124, a concave mirror 126, and a light transmission cover 128 inside a casing 115. Additionally, the display device 100 includes various sensors and actuators, which will be described below. The display 110 may be configured excluding the optical mechanism 122.

The light projection device 120 includes a 2-dimensional projection surface and projects light including an image. The light projection device 120 includes, for example, a light source 120A and a display element 120B. The light source 120A is, for example, a cold cathode tube and outputs visible light corresponding to the virtual image VI which the driver is allowed to see. The display element 120B controls transmission of the visible light from the light source 120A. Hereinafter, the visible light including the image transmitting the display element 120B is referred to as image light IL. The display element 120B is, for example, a thin film transistor (TFT) liquid crystal display device (LCD) that includes a 2-dimensional projection surface. The display element 120B may be an organic electro-luminescence (EL) display. In this case, the light source 120A may be omitted.

The optical mechanism 122 includes, for example, one or more lenses. The position of each lens can be adjusted in, for example, an optical axial direction. For example, the optical mechanism 122 is provided on a path of the image light IL output by the light projection device 120 and passes the image light IL incident from the light projection device 120 to emit the image light IL toward the front windshield 20. For example, the optical mechanism 122 can adjust a distance from the visual line position P1 (an example of a predetermined position) of the driver to a formation position P2 at which the image light IL is formed as a virtual image (hereinafter referred to as a virtual image seeing distance D) by changing the position of the lens. The visual line position P1 of the driver is a position at which the image light IL reflected by the concave mirror 126 and the front windshield 20 is condensed. In this position, the eyes of the driver are assumed to be positioned. Strictly speaking, the virtual image seeing distance D is a distance of a line segment that has a slope in the vertical direction. In the following description, however, when "a virtual image seeing distance D of 7 [m]" is expressed, this distance may means a distance in the horizontal direction.

In the following description, a dip angle θ is defined as an angle formed between a horizontal plane passing the visual line position P1 of the driver and a line segment from the visual line position P1 of the driver to the formation position P2. As the virtual image VI is formed on the lower side, that is, the visual line direction in which the driver sees the virtual image VI is lower, the dip angle θ increases. The dip angle θ is determined based on a reflection angle ϕ of the concave mirror 126 and a position at which an original image is displayed in the display element 120B. The reflection angle ϕ is an angle formed between an incident direction in which the image light IL reflected by the flat mirror 124 is incident on the concave mirror 126 and an exit direction in which the concave mirror 126 exits the image light IL.

The flat mirror 124 reflects the visible light (that is, the image light IL) exiting from the light source 120A and passing the display element 120B in a direction of the concave mirror 126.

The concave mirror 126 reflects the image light IL incident on the flat mirror 124 to exit the image light IL toward the front windshield 20. The concave mirror 126 is supported to be rotatable (revolvable) about the Y axis which is an axis in the width direction of the vehicle M.

The light transmission cover 128 transmits the image light IL from the concave mirror 126 so that the image light IL arrives at the front windshield 20, and suppresses penetration of foreign substances such as dust, dirt, or water drops into the casing 115. The light transmission cover 128 is provided in an opening formed in an upper member of the casing 115. An opening or a light transmission member is also provided in the instrument panel 30. The image light IL transmits the opening and the light transmission member of the instrument panel 30 and the light transmission cover 128 to arrive at the front windshield 20.

The image light IL incident on the front windshield 20 is reflected by the front windshield 20 to be condensed at the visual line position P1 of the driver. At this time, when the eyes of the driver are located at the visual line position P1 of the driver, the driver feels like as if an image pictured by the image light IL is displayed in front of the vehicle M.

Figure 4:
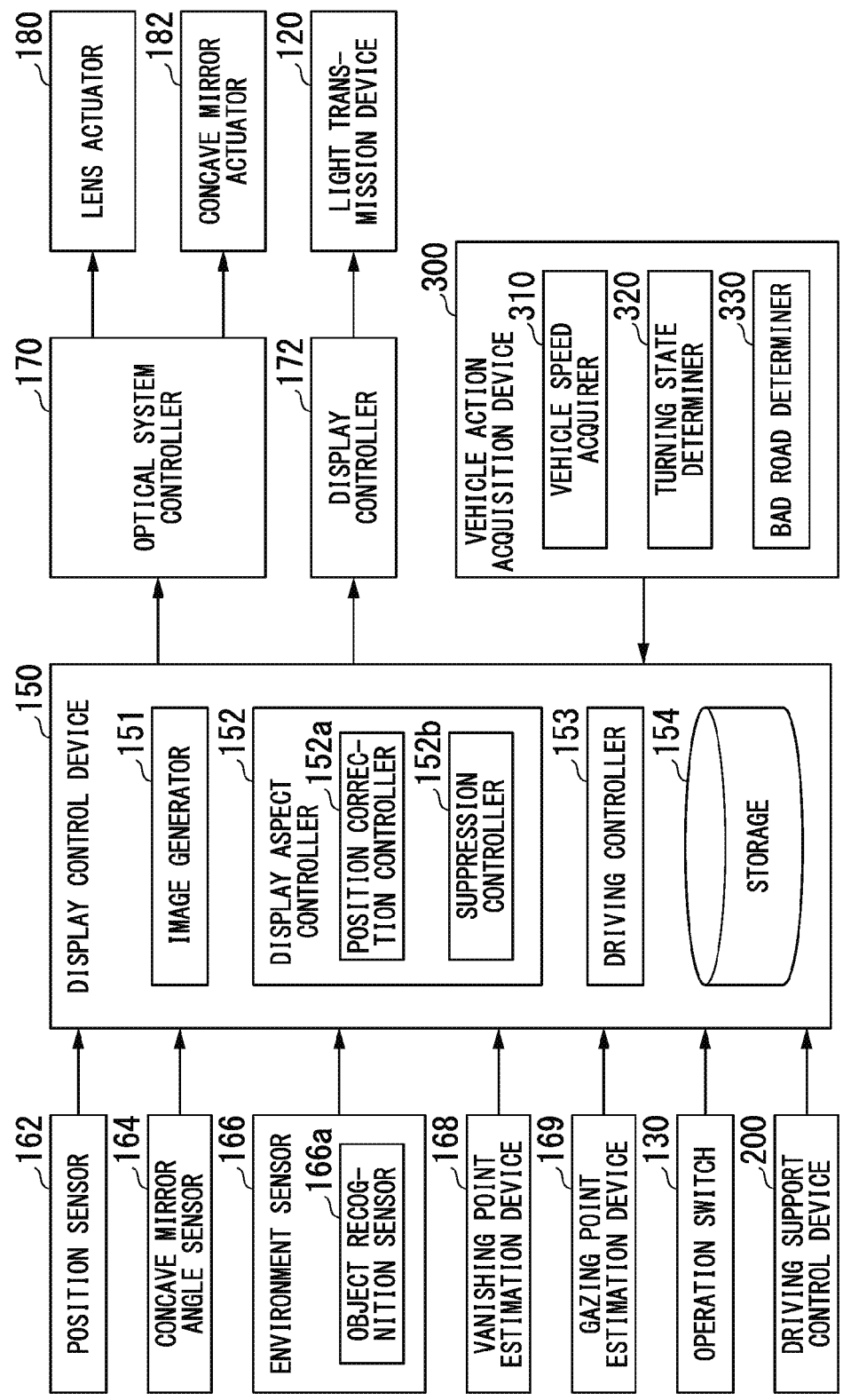
FIG. 4 is a diagram illustrating a configuration example of the display device centering on a display control device.

The display control device 150 controls display of the virtual image VI seen by the driver. FIG. 4 is a diagram illustrating a configuration example of the display device 100 centering on the display control device 150. In the example of FIG. 4, a position sensor 162, a concave mirror angle sensor 164, an environment sensor 166, a vanishing point estimation device 168, a gazing point estimation device 169, the operation switch 130, an optical system controller 170, a display controller 172, a lens actuator (an example of an optical mechanism actuator) 180, a concave mirror actuator 182, the light projection device 120, a driving support control device 200, and a vehicle action acquisition device 300 included in the display device 100 are illustrated in addition to the display control device 150.

The position sensor 162 detects positions of one or more lenses included in the optical mechanism 122. The position sensor 162 may detect a position of the display element 120B. The concave mirror angle sensor 164 detects a rotational angle about the Y axis of the concave mirror 126.

The environment sensor 166 includes, for example, an object recognition sensor 166a. The object recognition sensor 166a detects an object (for example, an obstacle such as another vehicle or a pedestrian) which is near the vehicle M using, for example, a camera, a radar device, or a finder (for example, a light detection and ranging (LIDAR) finder) mounted in the vehicle M. The camera is, for example, a digital camera that uses a solid-state image sensor such as a charged coupled device (CCD) or a complementary metal oxide semiconductor (CMOS). The single camera is mounted on any portion of the vehicle M. When the front side is imaged, the camera is mounted on an upper portion of the front windshield 20, a rear surface of a rearview mirror, or the like. For example, the camera repeatedly images the periphery of the vehicle M periodically. The camera may be a stereo camera. The radar device radiates radio waves such as millimeter waves to the periphery of the vehicle M and detects radio waves (reflected waves) reflected from an object to detect at least a position (a distance and an azimuth) of the object. The radar device is mounted on any portion of the vehicle M. The radar device may detect a position and a speed of an object in conformity with a frequency modulated continuous wave (FM-CW) scheme. The finder radiates light to the periphery of the vehicle M and measures scattered light of radiated light. The finder detects a distance to a target based on a time from light emission to light reception. The radiated light is, for example, a pulsed laser beam. The finder is mounted on any portion of the vehicle M. The object recognition sensor 166a performs a sensor fusion process on detection results from some or all of the camera, the radar device, and the finder and recognizes a position, a type, a speed, and the like of an object. The object recognition sensor 166a outputs recognition results or detection results of the camera, the radar device, and the finder to the display control device 150.

For example, the environment sensor 166 may include a temperature sensor that detects a temperature of the light projection device 120 or the optical mechanism 122 and an illumination sensor that detects illumination around the vehicle M. The environment sensor 166 may include a sensor detecting that it is necessary to inspect a brake system or an engine system of the vehicle, a headlight is set to a high beam, a door is not locked, a door is not completely closed, a fog lamp is turned on, a call is received in the telephone function mounted in the vehicle M, a timing of right or left turn toward a destination set in a navigation device nears, or the like.

For example, the vanishing point estimation device 168 analyzes an image captured by a camera mounted in the vehicle M in front of the vehicle M and estimates a position (coordinates) of the image on an image of a vanishing point of a road on which the vehicle M is traveling. The vanishing point is an infinite point.

For example, the gazing point estimation device 169 analyzes a vehicle interior image captured by a vehicle interior camera that is mounted in the vehicle M and captures a facial image of an occupant (including a driver) inside the vehicle and estimates a direction of a visual line from the facial image of the driver. Specifically, the gazing point estimation device 169 detects a positional relation between the head and eyes of the driver, a combination of standard points and moving points of the eyes, and the like from the vehicle interior using a scheme such as template matching. Then, the gazing point estimation device 169 derives orientation of the face based on the positions of the eyes with respect to the head. The gazing point estimation device 169 derives orientation of a visual line based on the positions of the moving points with respect to the standard points. For example, when the standard points are inner corners of the eyes, the moving points are irises. When the standard points are corneal reflection areas, the moving points are pupils. The gazing point estimation device 169 estimates a position (coordinates) matching the derived orientation of the visual line of the driver as a gazing point in a captured image of the camera used in the vanishing point estimation device 168. When a travel lane of the vehicle M is a straight line, the gazing point is within an area near the vanishing point. The area near the vanishing point is an area within a predetermined distance from the vanishing point.

The optical system controller 170 adjusts the virtual image seeing distance D by driving the lens actuator 180 based on a control signal output by the driving controller 153. The optical system controller 170 adjusts a rotational angle of the concave mirror by driving the concave mirror actuator 182 based on a control signal output by the driving controller 153.

The display controller 172 controls the light projection device 120 to output an image based on a display aspect generated by an image generator 151 and determined by a display aspect controller 152. The image includes, for example, a normally displayed image related to information for supporting driving of a driver (hereinafter referred to as a first image), an image displayed at the time of emergency or at the time of occurrence of a predetermined event, such as a predetermined function (hereinafter referred to as a second image). The predetermined event is, for example, an event generated in accordance with a state of the vehicle M. The event includes an event in accordance with various functions by the driving support control device 200 and an event (an inspection instruction or a warning) generated in accordance with information detected by the environment sensor 166. The second image is, for example, an image related to a lane departure warning, an image for notifying that the vehicle M approaches a front vehicle, an image indicating that a collision reduction brake operates, and other warning images. The second image may be displayed by allowing the first image to be interrupted or may be displayed along with the first image.

The display controller 172 adjusts a projection position on a projection surface of light projected from the light projection device 120 based on a control signal output by the display aspect controller 152. Since the adjustment of the projection position on the projection surface is performed through software control, the adjustment of the projection position is faster than driving control by hardware driving a motor or the like. Thus, the dip angle $\theta$ can be adjusted faster than in the adjustment of the dip angle $\theta$ by driving the concave mirror actuator 182 and changing the reflection angle $\varphi$ of the concave mirror 126. By adjusting the dip angle $\theta$, it is possible to move the display position of the virtual image VI in the displayable region A1 up and down.

The lens actuator 180 acquires a driving signal from the optical system controller 170 and moves the positions of one or more lenses included in the optical mechanism 122 driving the motor or the like based on the acquired driving signal. The lens actuator 180 may physically move the position of the display element 120B in accordance with the image light IL. In this way, the virtual image seeing distance D is adjusted. For example, the lens actuator 180 lengthens the virtual image seeing distance D within a range which does not exceed a maximum virtual image seeing distance as a speed of the vehicle M is larger, and shortens the virtual image seeing distance D within a range which does not exceed a minimum virtual image seeing distance as a speed of the vehicle M is smaller.

The concave mirror actuator 182 adjusts the reflection angle $\varphi$ of the concave mirror 126 by acquiring a driving signal from the optical system controller 170 and driving the motor or the like to rotate the concave mirror actuator 182 about the Y axis based on the acquired driving signal. In this way, the dip angle $\theta$ is adjusted.

In the embodiment, how the virtual image VI is seen by the driver is determined by a projection aspect (for example, a display position of an original image in the display element 120B) of the visible light in the light projection device 120 and a rotational angle of the concave mirror 126. For example, when at least one of the projection aspect of the visible light in the light projection device 120 and the rotational angle of the concave mirror 126 is changed, the dip angle $\theta$ of the virtual image VI is changed.

The driving support control device 200 performs the driving support function of supporting a driving operation by the driver of the vehicle M. When the driving support function is performed, for example, the vehicle M controls one or both of steering control and speed control without performing an operation of a driving operator (for example, the steering wheel 10, an accelerator pedal, or a brake pedal) by the driver. For example, when ACC is performed as the driving support function, the driving support control device 200 performs acceleration or deceleration control (speed control) based on an inter-vehicle distance to a front vehicle so that the vehicle is traveling in a state in which the inter-vehicle distance between the vehicle M and the front vehicle is constantly maintained, on the basis of information input via the object recognition sensor 166a or the environment sensor 166 mounted in the vehicle M. When LKAS is performed as the driving support function, the driving support control device 200 performs steering control so that the vehicle is traveling while the vehicle M keeps a travel lane in which the vehicle is currently traveling (lane-keeping). When CMBS is performed as the driving support function and the inter-vehicle distance between the vehicle M and the front vehicle is less than a predetermined distance, the driving support control device 200 performs deceleration control or stop control on the vehicle M. The driving support control device 200 outputs, for example, a state of the driving support function to the display control device 150. The driving support control device 200 outputs information for warning the driver (warning information) to the display control device 150 before LKAS or CMBS is performed. Examples of the warning information include lane departure warning and a front vehicle approach warning. When the above-described various functions are performed by the driving support control device 200, events are generated in accordance with the various functions.

The vehicle action acquisition device 300 acquires an action of the vehicle M while the driver is driving. The vehicle action acquisition device 300 includes, for example, a vehicle speed acquirer 310, a turning state determiner 320, and a bad road determiner 330. The vehicle speed acquirer 310 detects a speed or acceleration of the vehicle M. The turning state determiner 320 detects, for example, an angular velocity about a vertical axis of the vehicle M by a yaw rate sensor or a steering angle of the vehicle M. Then, the turning state determiner 320 determines that the vehicle M is in a turning state when the detected angular velocity is equal to or greater than a first threshold or the steering angle is equal to or greater than a second threshold, and determines that the vehicle M is not in the turning state when the angular velocity is less than the first threshold and the steering angle is less than the second threshold.

The bad road determiner 330 includes, for example, a pitch angle sensor that detects a pitch angle about the Y axis of the vehicle M and a height sensor (vehicle height sensor) that detects the height of the vehicle M or a slope of the vehicle. For example, the height sensor is installed in the front, rear, right, or left wheel of the vehicle M. Then, based on a detected detection result of the pitch angle sensor or the height sensor, the bad road determiner 330 determines whether or not there is a bad road in a road surface state of a travel lane of the vehicle M. The bad road is, for example, a hill road when a shake of the vehicle is equal to or greater than a predetermined amount due to a stepped difference, unevenness, or the like on a road, when a slope angle is equal to or greater than a predetermined angle, or the like. For example, the bad road determiner 330 determines that a road (lane) on which the vehicle M is traveling is a bad road when a change amount of the pitch angle by the pitch angle sensor is equal to or greater than a third threshold or when a change amount of the height of the vehicle M detected by the height sensor is equal to or greater than a fourth threshold. The bad road determiner 330 determines that the road is not a bad road when the change amount of the pitch angle is less than the third threshold and the change amount of the height of the vehicle M is less than the fourth threshold. The bad road determiner 330 may determine that the road is a bad road when a pitch angle or the number of decreases or increases in the height of the vehicle M within a predetermined time is equal to or greater than a predetermined number of times, and may determine that the road is not a bad road when the pitch angle or the number of decreases or increases is less than the predetermined number of times.

[Display Control Device]

Next, the display control device 150 will be described. The display control device 150 includes, for example, the image generator 151, the display aspect controller 152, a driving controller 153, and a storage 154. The constituent elements other than the storage 154 are realized, for example, by causing a hardware processor such as a central processing unit (CPU) to execute a program (software). Some or all of the constituent elements may be realized by hardware (circuit unit including circuitry) such as a large scale integration (LSI) circuit, an application specific integrated circuit (ASIC), a field-programmable gate array (FPGA), or a graphics processing unit (GPU) or may be realized by software and hardware in combination. The program may be stored in advance in the storage 154 such as an HDD or a flash memory of the display control device 150 or may be stored in advance in a storage medium (a storage medium including a non-transitory storage medium) such as a DVD or a CD-ROM which can be detachably mounted so that the storage medium is mounted on a drive device to be installed in the storage 154 of the display control device 150.

For example, the display control device 150 enables a function of each of the image generator 151, the display aspect controller 152, and the driving controller 153 to be performed when a signal for realizing an ON state by the operation switch 130 (the main switch 132) is received, and stops each of the above-described functions when a signal for realizing an OFF state is received.

When the display device 100 is in an ON state, the image generator 151 generates a first image that is shown to the driver in a state in which it overlaps scenery. For example, when a condition for interrupting the second image with an image caused to overlap the scenery is satisfied, the image generator 151 generates the second image instead of (or in addition to) the first image. Output of the displayed first and second images may be set by the driver using the operation switch 130, another operation device, or a graphical user interface (GUI) switch or the like displayed on the second display 50-2. Setting information set by the driver is stored in the storage 154 or the like. For example, when warning information is output by the driving support control device 200, the image generator 151 generates one image or a plurality of images based on occurrence of an event for outputting the warning information. The image includes, for example, content or an icon, a mark, or a traffic sign for identifying the content.

The display aspect controller 152 sets a display aspect of the image generated by the image generator 151 and generates control information for displaying the image in the set display aspect. The display aspect is presence or absence of display of the virtual image VI (the first or second image) overlapping scenery to be seen by the driver, a control amount adjusted in accordance with a display position among the position (the dip angle θ), size, and luminance and the virtual image viewing distance D of an image in the case of display, or the like. The display aspect controller 152 changes the display aspect of the virtual image VI based on a lens position detected by the position sensor 162 or a rotational angle of the concave mirror 126 detected by the concave mirror angle sensor 164. The display aspect controller 152 outputs the generated control information to, for example, the display controller 172, the driving controller 153, or the like.

The display aspect controller 152 includes, for example, a position correction controller 152a and a suppression controller 152b. The position correction controller 152a acquires an external environment of the vehicle M based on content of information acquired by the environment sensor 166 or information acquired by the vehicle action acquisition device 300 (for example, a vehicle speed, a turning state determination result, or a bad road determination result). When the acquired external environment satisfies a predetermined condition, the position correction controller 152a generates control information for correcting the display position of the virtual image VI and outputs the generated control information to the display controller 172. The external environment includes, for example, a surrounding environment such as an action, a posture, congestion, or the like of the vehicle M. The position correction controller 152a may generate control information for adjusting a projection position on a projection surface of light projected from the light projection device 120 so that a variation in the dip angle θ occurring due to an action of the vehicle M is cancelled. When the predetermined condition is satisfied, the suppression controller 152b suppresses the correction control in the position correction controller 152a. The details of a function of the display aspect controller 152 will be described later.

The driving controller 153 generates a control signal for moving the positions of one or more lenses included in the optical mechanism 122 or the position of the display element 120B or control signal for adjusting a rotational angle of the concave mirror 126 based on the control information output by the display aspect controller 152, and outputs the generated control signal to the optical system controller 170. The driving controller 153 generates a control signal so that the virtual image VI is seen at a position (the dip angle θ or the virtual image seeing distance D) instructed by the display aspect controller 152 based on the positions of the lenses or the position of the display element 120B detected by the positional sensor 162 and the rotational angle of the concave mirror 126 detected by the concave mirror angle sensor 164, and outputs the generated control signal to the optical system controller 170.

The storage 154 is realized as, for example, a read-only memory (ROM), a random access memory (RAM), a hard disk drive (HDD), or a flash memory. The storage 154 stores, for example, set information and other information.

Figure 5:
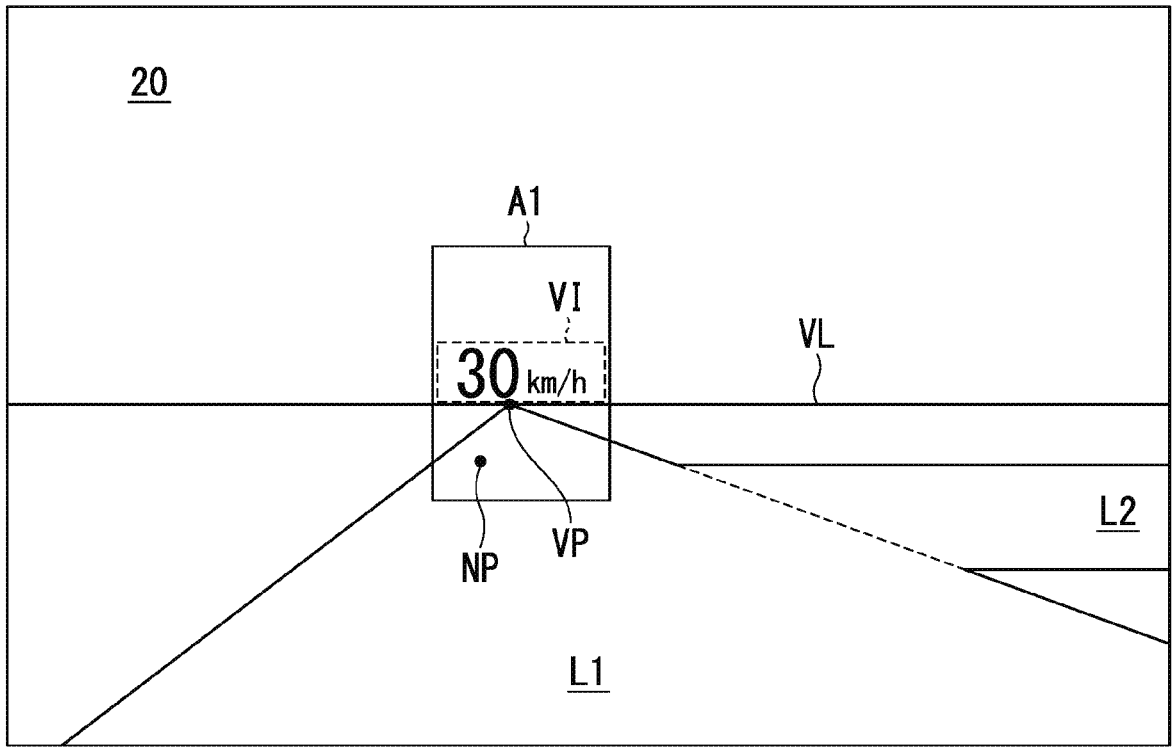
FIG. 5 is a diagram illustrating an example of a virtual image overlapping scenery.

Next, an example of an image which is caused to overlap scenery by the display device 100 and can be seen as the virtual image VI by the driver will be described. FIG. 5 is a diagram illustrating an example of the virtual image VI overlapping scenery. The example of FIG. 5 indicates an example of the virtual image VI seen within the displayable region A1 of the front windshield 20 and overlapping scenery by the display device 100. In the example of FIG. 5, the vehicle M is assumed to be traveling in a lane L1. A lane 2 is assumed to be connected to the lane L1.

In the example of FIG. 5, the virtual image VI indicating a speed of the vehicle M which is an example of the first image is indicated. In the virtual image VI, a plurality of pieces of information in the first or second image may be displayed instead of (or in addition to) a speed of the vehicle M. In the example of FIG. 5, the display aspect controller 152 generates an image indicating a speed of the vehicle M as an image in accordance with a vehicle state after activation (ON state) of the display device 100, and outputs the generated image from the light projection device 120. Here, since the vehicle M is traveling in an extension direction (the X direction in the drawing) of the lane L1, the virtual image VI indicating a speed of the vehicle M overlaps in the vicinity of the vanishing point VP estimated by the vanishing point estimation device 168 as a result. In general, when the vehicle M is traveling in the extension direction of the lane L1, the driver is in the lane L1 in the front of the vehicle M at the time of driving and the gazing point NP is located in the vicinity of the vanishing point VP of the travel lane L1. Therefore, by displaying the virtual image VI in the vicinity of the vanishing point VP of the travel lane L1, it is possible to improve visibility of the virtual image VI. The driver can set the display position of the virtual image VI in the displayable region A1 using, for example, the adjustment switches 134 and 136 of the operation switch 130.

Figure 6:
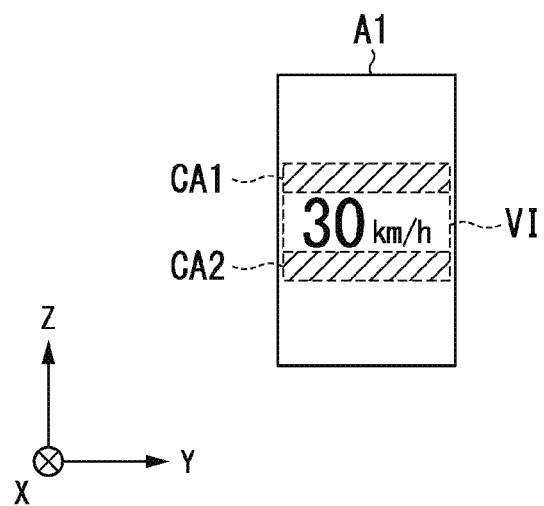
FIG. 6 is a diagram illustrating a process by a position correction controller.

The position correction controller 152a corrects the position of the virtual image VI based on the external environment of the vehicle M acquired by the environment sensor 166 or the vehicle action acquisition device 300. FIG. 6 is a diagram illustrating a process by the position correction controller 152a. The example of FIG. 6 shows an up correction region CA1 and a down correction region CA2 at the display position of the virtual image VI set in accordance with the set information. The displayable region A1 is a range that is changeable in accordance with setting by the driver, a vehicle speed, or the like. For example, as a speed of the vehicle M acquired by the vehicle speed acquirer 310 increases, the position correction controller 152a moves the display position of the virtual image VI from the set position upwards within the range of the displayable region A1. This is because the gazing point of the driver is located at a farther forward position as the speed increases. When the speed of the vehicle M returns from an increase state to a decrease state, the position correction controller 152a moves the display position of the virtual image VI downwards so that the display position of the virtual image VI returns to a standard position. The correction of the position of the virtual image VI at this time is performed by adjusting the reflection angle of the concave mirror 126 by, for example, the concave mirror actuator 182.

Figure 7:
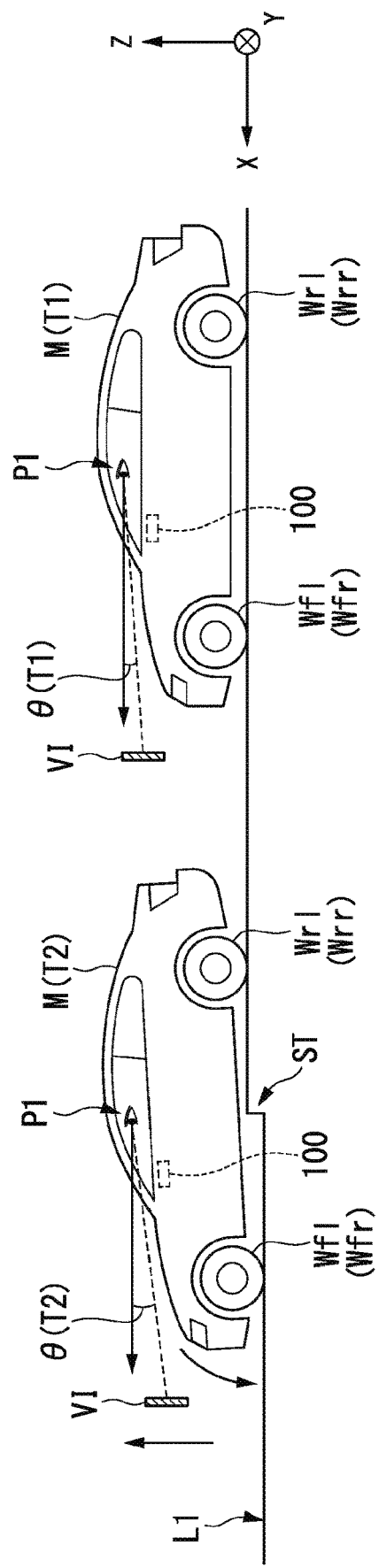
FIG. 7 is a diagram illustrating a variation in a dip angle in accordance with an external environment of the vehicle.

When a variation in the dip angle θ (more specifically, a deflection of the virtual image VI) occurs depending on an external environment of the vehicle M, the position correction controller 152a may perform deflection correction to suppress the variation. FIG. 7 is a diagram illustrating a variation in the dip angle θ in accordance with an external environment of the vehicle M.

In FIG. 7, it is assumed that the vehicle M is traveling on the road L1 at a constant speed and there is a stepped difference ST on the road L1. The vehicle M at times T1 and T2 (where T1<T2) is indicated by M (T1) and M (T2) and the dip angle θ is indicated by θ (T1) and θ (T2). The left and right front wheels of the vehicle M are indicated by Wfl and Wfr and the left and right rear wheels are indicated by Wrl and Wrr, respectively.

In the case of time T1, the vehicle M (T1) is traveling in the horizontal direction (the X direction in the drawing).

In this case, the display device 100 is assumed to display the virtual image VI at a position away from the visual line position P1 of the driver by the virtual image viewing distance D and at a position of the dip angle θ (T1) based on the set information.

Here, in the case of time T2, since the left and right front wheels Wfl and Wfr of the vehicle M (T2) are at the lower stage of the stepped difference ST and the left and right rear wheels Wrl and Wrr are on the upper stage of the stepped difference, the vehicle M (T2) is in a forward inclined state. In this case, the position of the virtual image VI is a position at which the virtual image viewing distance D is constant and a dip angle is the dip angle θ (T2) obtained by adding an angle at which the vehicle M (T2) is inclined forward (for example, an angle approximate to a pitch angle with respect to the vehicle M) to the dip angle θ (T1) by the display device 100 (where θ (T1)<θ (T2)). In this case, since the virtual image VI seen by the driver is deflected downward, visibility deteriorates in some cases. This phenomenon also occurs when the vehicle M is traveling on a downhill road in some cases. Accordingly, the position correction controller 152a performs position correction so that the dip angle θ (T1) is constant when the above-described surrounding environment of the vehicle M is changed.

Figure 8:
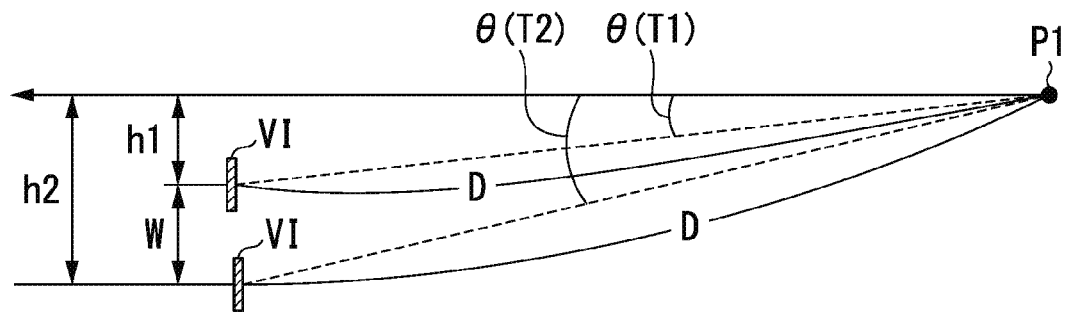
FIG. 8 is a diagram illustrating a calculation example of a variation width in the vertical direction.

Specifically, the position correction controller 152a calculates a variation width in the vertical direction in the case of transition from the dip angle θ (T1) to the dip angle θ (T2) and performs adjustment of the dip angle so that the calculated variation width approximates zero (0). FIG. 8 is a diagram illustrating a calculation example of a variation width W in the vertical direction. A posture or the positions of the eyes of the driver are different due to a posture of the vehicle M, vibration occurring at the time of passing through the stepped difference ST, or the like at times T1 and T2, but since the change amount is minimum compared to the virtual image viewing distance D, the change amount is not considered in the description. Accordingly, the variation width W obtained in the following calculation is an approximate value of an actual variation width.

In the example of FIG. 8, the position correction controller 152a calculates a distance (a height in the vertical direction) h1 from a horizontal plane to a middle position of the virtual image VI at the dip angle θ (T1). The distance h1 is calculated as, for example, h1=D sin θ (T1). The position correction controller 152a calculates a distance h2 from the horizontal plane to the middle position of the virtual image VI at the dip angle θ (T2). The distance h2 is calculated as, for example, h2=D sin θ (T2). The dip angle θ (T2) may be derived based on, for example, a pitch angle detected by the pitch angle sensor included in the environment sensor 166 and a dip angle θ1 determined by the display aspect controller 152 or may be derived based on values detected by the height sensors provided in the front wheels Wfl and Wfr and the rear wheels Wrl and Wrr. Then, the position correction controller 152a calculates the variation width W with a difference (h2−h1) between the distances h2 and h1.

Instead of the above-described calculation scheme, the position correction controller 152a may store a lookup table (LUT) in which the variation width W is associated with a difference value between the dip angle θ (T1) and the dip angle θ (T2) or a difference value between the distances h2 and h1 in the storage 154 and may acquire the associated variation width W from the difference value with reference to the LUT when the dip angle θ (T1) and the dip angle θ (T2) or the distances h1 and h2 are acquired.

The position correction controller 152a performs correction control on the dip angle θ within a range which does not exceed the up correction region CA1 so that the acquired variation width W is cancelled to zero (0). When the concave mirror actuator 182 is used for the correction in the correction control of the dip angle θ, a time lag occurs at a timing of a change in an action of the vehicle M and a timing of the correction control of the dip angle θ due to a delay in a response due to an influence of a driving time or the like of a motor, and thus there is a possibility of the up or down deflection movement of the virtual image VI in an opposite direction to a shake direction of the vehicle M. Thus, the position correction controller 152a performs the correction control on the dip angle θ by adjusting a projection position on the projection surface of light projected from the light projection device 120 through display control by the display controller 172 with high responsiveness. Specifically, the position correction controller 152a controls the display controller 172 such that the position of the virtual image VI is moved upward by the variation width W. The position correction controller 152a also performs down shake correction as in the above-described upward shake correction. Thus, the position correction controller 152a can suppress a variation in the dip angle occurring due to a variation in an action of the vehicle M. Since the above-described position correction control can be realized through display control of an image by the display element 120B, responsiveness is high and the position correction control can be performed more quickly than in adjustment of the reflection angle φ of the concave mirror 126 by the concave mirror actuator 182. Therefore, it is possible to perform deflection correction at a more appropriate timing in response to a change in an action of the vehicle M.

The position correction controller 152a may determine whether or not the variation width W is equal to or greater than a threshold. When the variation width W is equal to or greater than the threshold, the display aspect controller 152 may perform the above-described correction control on the dip angle θ.

The suppression controller 152b suppresses the correction control when a predetermined condition is satisfied in the above-described correction control by the position correction controller 152a. For example, the suppression controller 152b suppresses the correction control by the position correction controller 152a when a gazing point of an occupant of the vehicle M deviates from a vanishing point of a travel lane of the vehicle M as the predetermined condition. The deviation of a gazing point from a vanishing point means, for example, that a 2-dimensional distance between the gazing point and the vanishing point on a front image of the vehicle M captured by a camera is equal to or greater than a predetermined distance. The suppression of the correction control means, for example, that correction of the position of the virtual image VI is not performed or the degree of position correction is small.

Thus, it is possible to prevent discomfort of the driver from occurring since the virtual image VI displayed in a region at which the driver does not gaze is moved based on an external environment or an action of the vehicle M.

Figure 9:
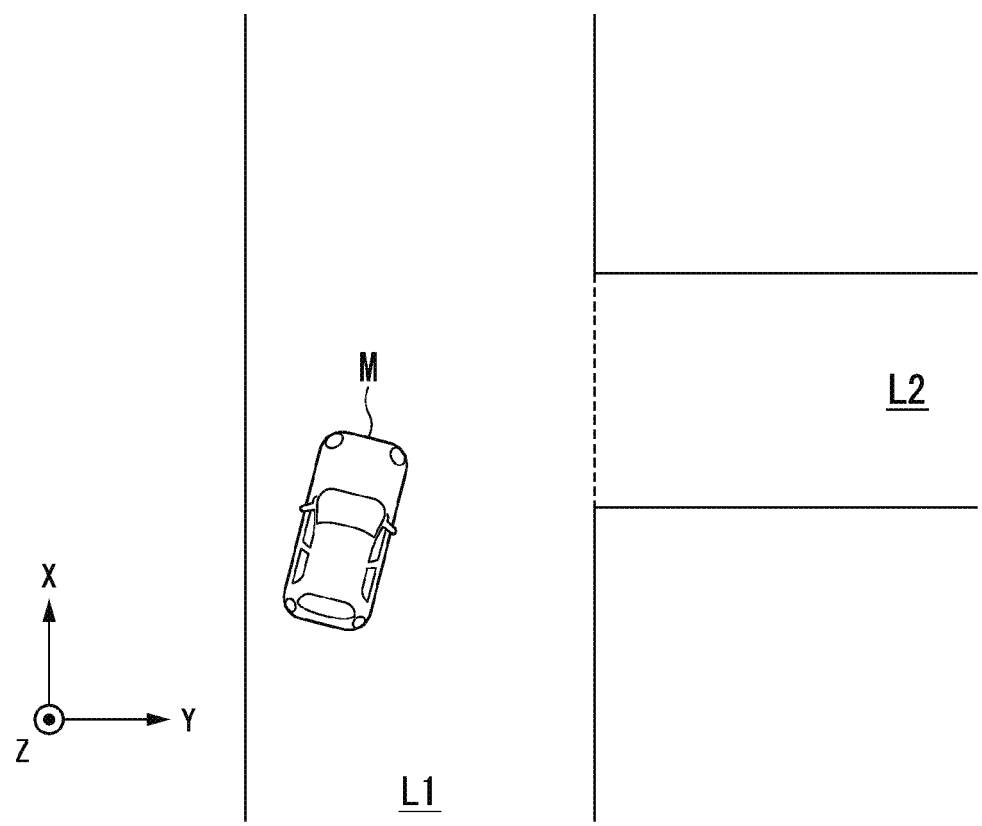
FIG. 9 is a diagram illustrating an aspect at the time of turning of the vehicle.
Figure 10:
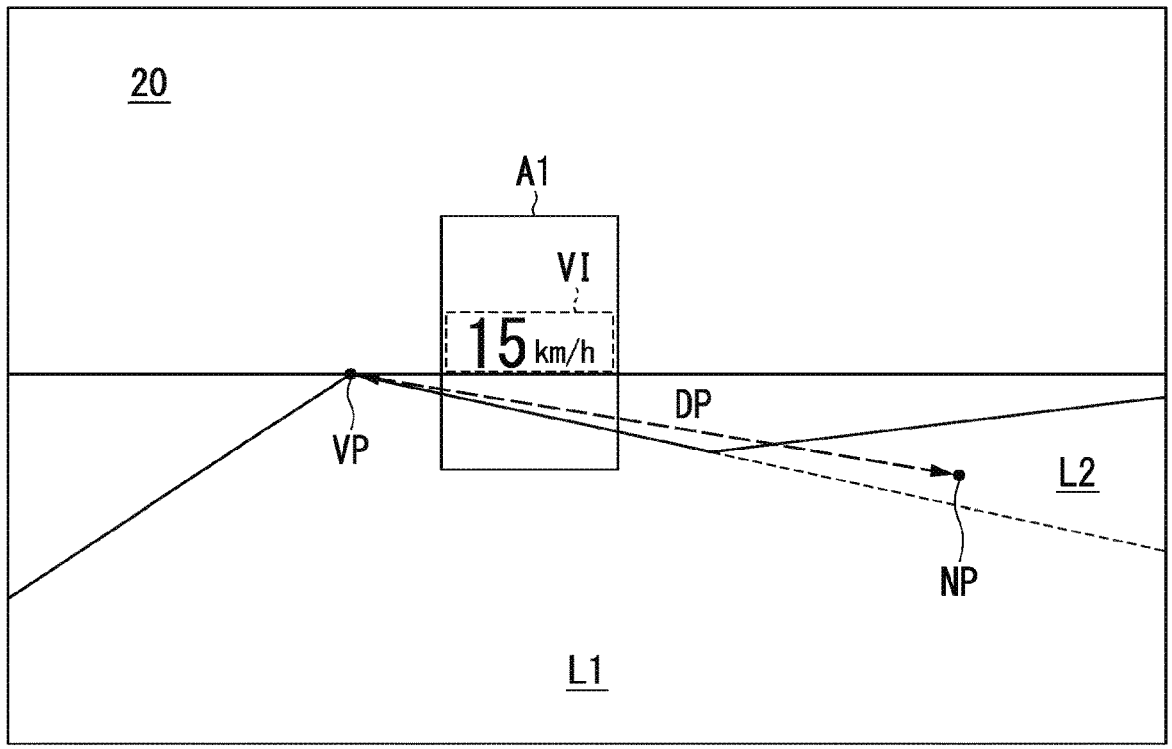
FIG. 10 is a diagram illustrating a distance between a vanishing point and a gazing point in a turning state of the vehicle in FIG. 9.
Figure 10:
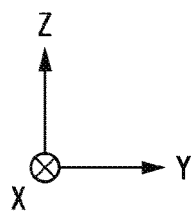

Here, an example of an action of the vehicle M in which the distance between the gazing point and the vanishing point is equal to or greater than the predetermined distance includes a case in which the vehicle M is turning left or right or a case in which the vehicle M is traveling on a curved road. Accordingly, when the turning state determiner 320 determines that an action of the vehicle M is a turning state, the suppression controller 152b may suppress correction of the position of the virtual image VI by the position correction controller 152a. FIG. 9 is a diagram illustrating an aspect at the time of turning of the vehicle. The example of FIG. 9 shows an aspect at a time point at which the vehicle M starts turning right from the lane L1 to the lane L2 and the vehicle action acquisition device 300 determines that the vehicle M is in the turning state. In the turning state of the vehicle M illustrated in FIG. 9, the driver gazes toward the vicinity of the lane L2 which is a right-turning destination rather than the vicinity of the vanishing point VP. FIG. 10 is a diagram illustrating a distance between the vanishing point VP and the gazing point NP in a turning state of the vehicle M in FIG. 9. In a right-turning scenario illustrated in FIG. 9, it is assumed that the gazing point NP of the driver is on the lane L2 which is a right-turning destination and a distance DP between the vanishing point VP and the gazing point NP is equal to or greater than a predetermined distance. In this case, the suppression controller 152b suppresses the correction of the position of the virtual image VI by the position correction controller 152a.

When a speed of the vehicle M obtained by the vehicle speed acquirer 310 is equal to or less than a predetermined speed, the suppression controller 152b may suppress the correction of the position by the position correction controller 152a. The predetermined speed is, for example, about 10 [km/h]. That is, when the vehicle M is stopping or traveling at a low speed, for example, the gazing point of the driver is estimated to be placed on the second display 50-2 inside the vehicle or in another direction or a forward position near the vehicle. Therefore, the distance between the gazing point and the vanishing point is equal to or greater than the predetermined distance. Accordingly, the suppression controller 152b enables the driver to view the virtual image VI without discomfort by suppressing the correction control of the display position of the virtual image VI at the time of launch of the vehicle M or at the time of slow traveling of the vehicle M or suppressing movement of the display position according to a change in a posture of the slowing vehicle M. Since the importance of the driver being able to view the virtual image VI at the time of stopping or at the time of slow traveling is low, an influence is small even in suppression of the position correction at the time of stopping or at the time of slow traveling. By suppressing the correction of the position of the virtual image VI at the time of stopping or at the time of slow traveling, it is possible to reduce a processing load of the position correction.

Here, an example of an action of the vehicle M in which a speed of the vehicle M is slow includes a case in which a travel lane of the vehicle M is congested. Accordingly, for example, the suppression controller 152b determines whether or not the travel lane of the vehicle M is congested in accordance with a recognition result by the object recognition sensor 166a. When the suppression controller 152b determines that the travel lane is congested, the suppression controller 152b may suppress the correction of the position by the position correction controller 152a.

When the bad road determiner 330 determines that a road on which the vehicle M is traveling is a bad road, the suppression controller 152b may suppress the correction of the position of the virtual image VI by the position correction controller 152a. Thus, for example, when unevenness of a road continues, a processing load of the position correction can be reduced by suppressing the correction of the position of the virtual image VI.

For example, when an end of the virtual image VI comes into contact with the upper end of the displayable region A1, the position correction controller 152a may not move the virtual image VI upward any more. Similarly, when an end of the virtual image VI comes into contact with the lower end of the displayable region A1, the position correction controller 152a may not move the virtual image VI downward any more. Accordingly, when the end of the virtual image VI comes into contact with the upper end or the lower end of the displayable region A1, the suppression controller 152b may suppress the correction of the position of an image.

Figure 11:
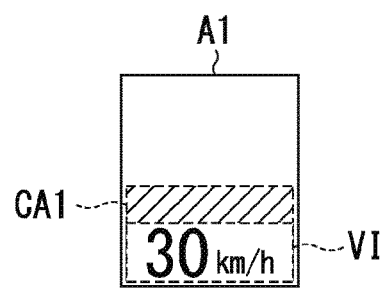
FIG. 11 is a diagram illustrating correction suppression control at a display position of a virtual image.
Figure 11:
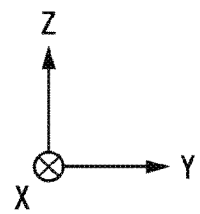

FIG. 11 is a diagram illustrating correction suppression control at a display position of the virtual image VI. In the example of FIG. 11, the lower end of the virtual image VI is displayed so that the lower end of the virtual image VI comes into contact with the lower end of the displayable region A1. A display aspect illustrated in FIG. 11 is realized through, for example, correction control by the position correction controller 152a in accordance with an external environment of the vehicle M (for example, a posture in a case in which the vehicle is traveling uphill) or an operation of the adjustment switch 136 by the driver. When the lower end of the displayable region A1 comes into contact with the end of the virtual image VI, the suppression controller 152b suppresses the correction of the position by the position correction controller 152a since the virtual image VI may not be further moved vertically any more. The suppression controller 152b may suppress only downward correction of the position by the position correction controller 152a and may permit upward correction of a position within a range of the displayable region A1 or the up correction region CAL Here, when an end of the virtual image VI is displayed so that the end of the virtual image VI comes into contact with the lower end of the displayable region A1, as illustrated in FIG. 11, the dip angle θ is maximum. Accordingly, when the magnitude of the dip angle θ is the maximum angle, the suppression controller 152b may suppress the correction of the position by the position correction controller 152a.

The suppression controller 152b may control the degree of correction by the position correction controller 152a based on an external environment of the vehicle M. The degree of correction is magnitude of a suppression amount of the correction or magnitude of a correction amount of the position of the virtual image VI based on the external environment of the vehicle M. For example, the suppression controller 152b adjusts a correction gain (the magnitude of a correction amount) based on the size of a pitch angle, the magnitude of a vehicle speed, the magnitude of a steering angle, or the like.

Figure 12:
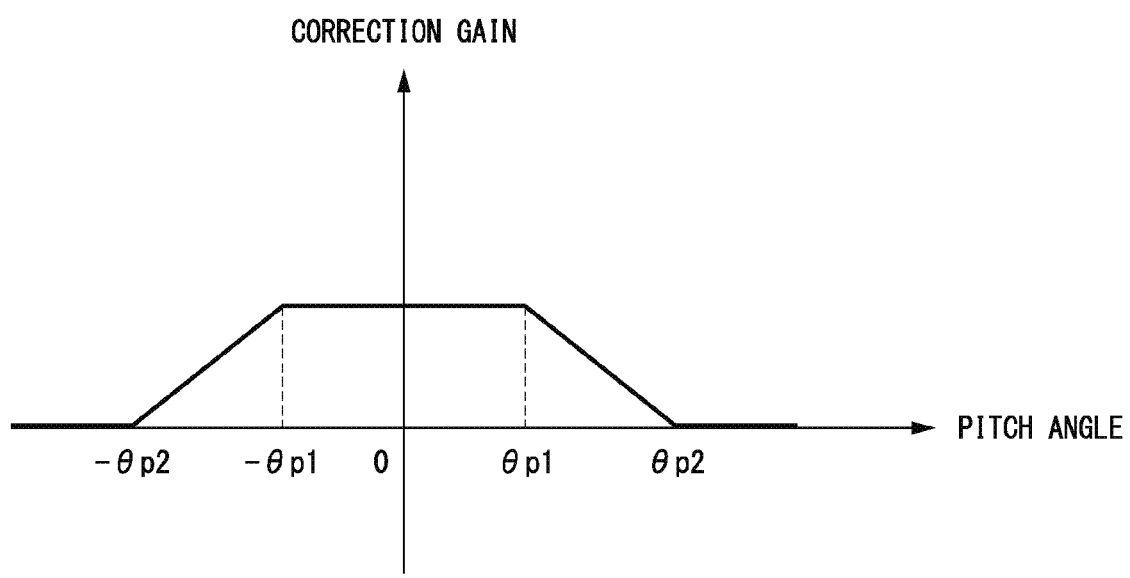
FIG. 12 is a diagram illustrating a relation between a pitch angle and a correction gain.

FIG. 12 is a diagram illustrating a relation between a pitch angle and a correction gain. In FIG. 12, the horizontal axis represents a pitch angle and the vertical axis represents a correction gain. The suppression controller 152b sets a pitch angle θp obtained from the environment sensor 166 to zero, for example, when the vehicle M is traveling horizontally, and changes a correction gain when the pitch angle θp varies at the time of traveling on a stepped difference, a hill road, or the like. In FIG. 12, it is assumed that a case in which the pitch angle θp is positive indicates a downward angle from a horizon ground and a case in which the pitch angle θp is negative indicates an upward angle from the horizontal ground. For example, when the pitch angle θp is equal to or greater than −θp1 and equal to or less than θp1, the suppression controller 152b corrects the display position of the virtual image VI based on an external environment of the vehicle M with a pre-decided correction gain without suppressing the correction control by the position correction controller 152a. As the pitch angle decreases from −θp1 to −θp2 or increases θp1 to θp2, the suppression controller 152b suppresses the correction of the position by the position correction controller 152a so that the correction gain decreases. When the pitch angle θp is less than −θp2 and greater than θp2, the suppression controller 152b does not perform the correction of the position by the position correction controller 152a. Thus, since the virtual image VI can be displayed at a more appropriate position, it is possible to improve visibility of the driver. Through the above-described process, the correction gain decreases as the display position of the virtual image VI is closer to the end (limit position) of the displayable region. Therefore, it is possible to enable the driver to easily recognize that the movement range of the virtual image VI is close to the limit position.

[Process Flow]

Figure 13:
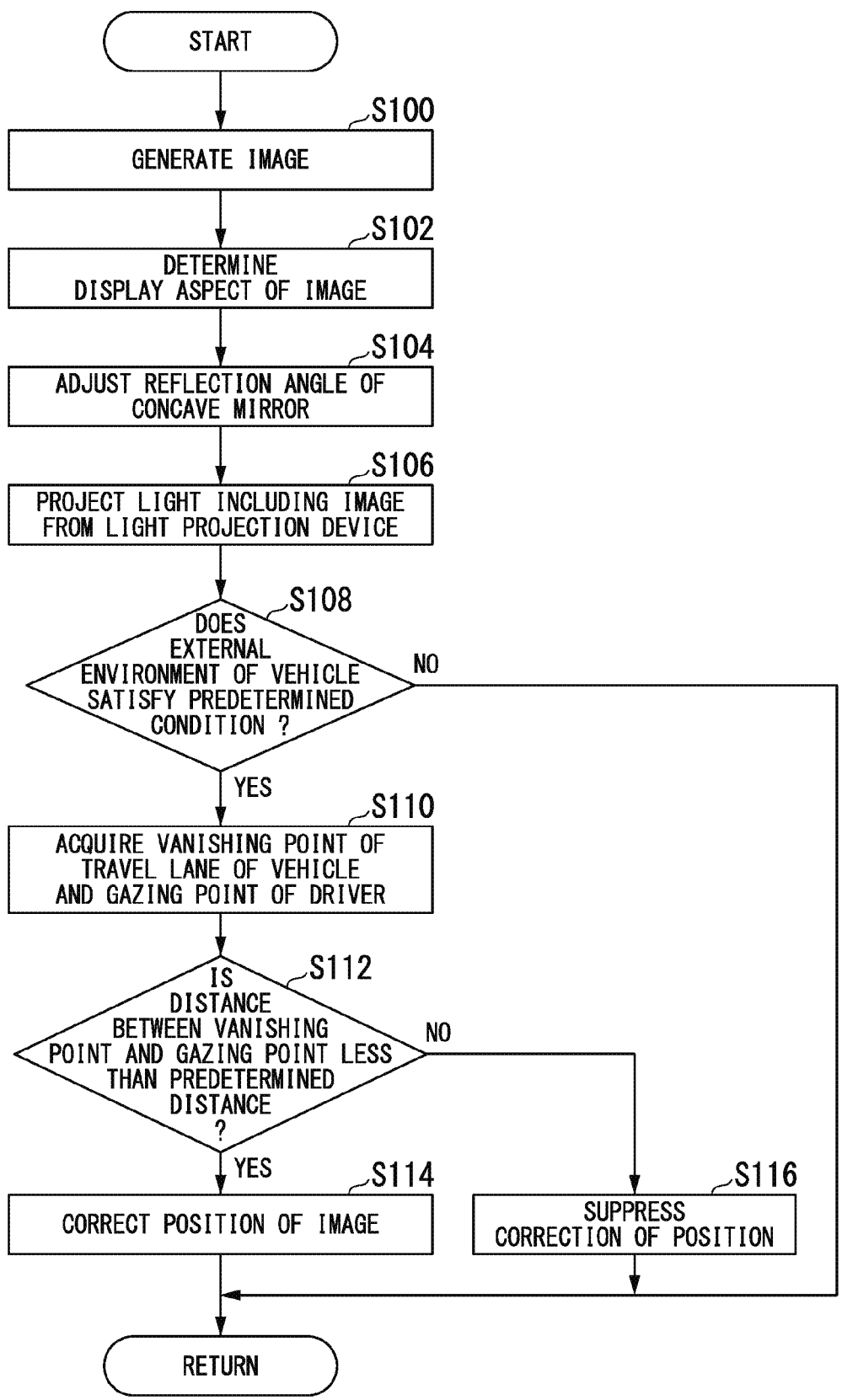
FIG. 13 is a flowchart illustrating a flow of a process performed by the display device according to the embodiment.

FIG. 13 is a flowchart illustrating a flow of a process performed by the display device 100 according to the embodiment. The process of FIG. 13 is repeatedly performed at a predetermined timing, for example, after the display device 100 is turned on by the operation switch 130.

First, the image generator 151 generates an image to overlap scenery based on the set information stored in the storage 154 and an external environment of the vehicle M (step S100). Subsequently, the display aspect controller 152 determines a display aspect of the generated image based on the set information or the like (step S102). Subsequently, the driving controller 153 causes the optical system controller 170 to control the concave mirror actuator 182 based on the display aspect determined by the display aspect controller 152 to adjust the reflection angle φ of the concave mirror 126 so that the virtual image VI can be seen at a dip angle indicated by the display aspect (step S104). Subsequently, the display aspect controller 152 causes the display controller 172 to project light including the generated image based on the display aspect from the light projection device 120 (step S106).

Subsequently, the display aspect controller 152 determines whether or not the external environment of the vehicle M satisfies the predetermined condition based on an action of the vehicle M acquired by the vehicle action acquisition device 300 (step S108). When the external environment of the vehicle M satisfies the predetermined condition, the display aspect controller 152 acquires a vanishing point of a travel lane of the vehicle M estimated by the vanishing point estimation device 168 and a gazing point of the driver estimated by the gazing point estimation device 169 (step S110). Subsequently, the display aspect controller 152 determines whether or not a distance between the vanishing point and the gazing point on an image captured by a camera is less than a predetermined distance (step S112). When the distance between the vanishing point and the gazing point is less than the predetermined distance, the position correction controller 152a performs the correction of the position of the image based on the external environment of the vehicle M (step S114). When the distance between the vanishing point and the gazing point is equal to or greater than the predetermined distance, the suppression controller 152b suppresses the correction of the position by the position correction controller 152a (step S116). Thus, the process of the flowchart ends. When the external environment of the vehicle M does not satisfy the predetermined condition in the process of step S108, the process of the flowchart ends.

According to the above-described embodiment, the display device 100 includes: the light projection device 120 configured to project light including an image, the optical mechanism 122 provided on a path of the light and configured to be capable of adjusting a distance from a predetermined position to a position at which the light is formed as a virtual image, and the display control device 150 configured to control the light projection device 120. The display control device 150 corrects a position of an image formed based on an external environment of the vehicle M when a distance between a gazing point of an occupant of the vehicle M and a vanishing point of a travel lane of the vehicle M is less than a predetermined distance, and suppresses the correction of the position of the image when the distance between the gazing point and the vanishing point is equal to or greater than the predetermined distance. Thus, it is possible to improve visibility of the image. Specifically, according to the embodiment, when the position of the image based on the external environment of the vehicle M is corrected and the gazing point of the driver deviates from the vanishing point, the correction of the position of the image is suppressed. According to the embodiment, the correction of the position of the image is suppressed under a predetermined condition such as the time of turning the vehicle M, the time of launch of the vehicle M, the time of traveling of the vehicle M at a low speed, or the time of traveling of a bad road or a hill road. Thus, it is possible to suppress movement of the image causing discomfort of the driver and improve visibility of the image by the driver.

According to the above-described embodiment, for example, the display device 100 may project an image to a light transmission reflection member such as a combiner provided between the position of the driver and the front windshield 20 instead of projecting an image directly to the front windshield 20.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display device comprising:
a light projection device configured to project light including an image;
an optical mechanism provided on a path of the light and configured to be capable of adjusting a distance from a predetermined position to a position at which the light is formed as a virtual image; and
a control device configured to control the light projection device,
wherein the control device corrects a position of an image formed based on an external environment of a vehicle when a distance between a gazing point of an occupant of the vehicle and a vanishing point of a travel lane of the vehicle is less than a predetermined distance, and suppresses the correction of the position of the image when the distance between the gazing point and the vanishing point is equal to or greater than the predetermined distance.

2. The display device according to claim 1, wherein the control device suppresses the correction of the position of the image when the vehicle is in a turning state.

3. The display device according to claim 1, wherein the control device suppresses the correction of the position of the image when a speed of the vehicle is equal to or less than a predetermined speed.

4. The display device according to claim 1, wherein the control device suppresses the correction of the position of the image when a road on which the vehicle is traveling is congested.

5. The display device according to claim 1, wherein the control device changes a degree of the correction of the position of the image based on an external environment of the vehicle.

6. The display device according to claim 1, wherein the control device suppresses the correction of the position of the image when an end of the image comes into contact with an upper end or a lower end of a displayable region of the image.

7. A display control method in a display device that includes a light projection device projecting light including an image, an optical mechanism provided on a path of the light and capable of adjusting a distance from a predetermined position to a position at which the light is formed as a virtual image, and a control device controlling the light projection device, the method comprising:

correcting a position of an image formed based on an external environment of a vehicle when a distance between a gazing point of an occupant of the vehicle and a vanishing point of a travel lane of the vehicle is less than a predetermined distance; and suppressing the correction of the position of the image when the distance between the gazing point and the vanishing point is equal to or greater than the predetermined distance.

8. A computer-readable non-transitory storage medium that stores a program causing a display device that includes a light projection device projecting light including an image, an optical mechanism provided on a path of the light and capable of adjusting a distance from a predetermined position to a position at which the light is formed as a virtual image, and a control device controlling the light projection device to perform:

correcting a position of an image formed based on an external environment of a vehicle when a distance between a gazing point of an occupant of the vehicle and a vanishing point of a travel lane of the vehicle is less than a predetermined distance; and suppressing the correction of the position of the image when the distance between the gazing point and the vanishing point is equal to or greater than the predetermined distance.

* * * * *